S. S. Rain,

Cage Trap,

N° 68,651.  Patented Sep. 10, 1867.

United States Patent Office.

SAMUEL S. RAIN, OF LOWVILLE, NEW YORK.

Letters Patent No. 68,651, dated September 10, 1867.

---

IMPROVEMENT IN ANIMAL TRAPS.

---

*The Schedule referred to in these Letters Patent and making part of the same.*

---

Be it known that I, SAMUEL S. RAIN, of Lowville, in the county of Lewis, State of New York, have invented a new and useful Improvement in Animal Traps; and I do hereby declare the following is a full, clear, and exact description of the construction and operation of the same, reference being had to the annexed drawings, making part of this specification, in which—

Figure 3:
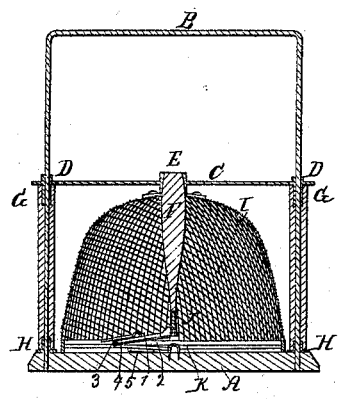
Figure 3 represents the trap as sprung to catch the animal.
Figure 4:
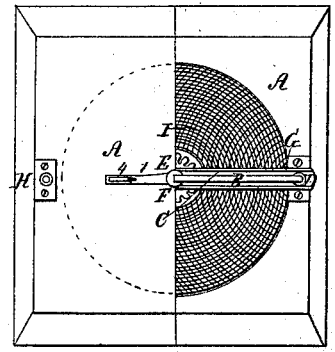
Figure 4 is a half-and-half plan view of the improvement, the lettering representing similar parts in each figure.

A is a square bed-plate of some hard wood or metal, to which is firmly attached the gallows standard B of round iron. Sliding vertically upon this wire standard is the metal cross-bar C, which has at each end a sleeve firmly secured, encircling the vertical parts of B, yet sliding upon the same. Encircling the lower parts of these vertical portions of the gallows standard B are a couple of spiral wire springs, G G, made fast to the bottom of the standard at H, and also to the sleeves D D, upon the cross-bar, in such a manner as to retain C at the position shown in fig. 3, when not distrained to the contrary. I is a wire cage, secured at its top to the cross-bar at E in any proper manner. Depending from the top of this cage is a centre pendant, F, made firm to the top of the cage and cross-bar. Attached to the lower end of F is a metal lock, which connects it with the base A at the point K by a staple. This lock consists of the two metal pieces 1 and 2, having a hinge-joint at 3, and fastened to the pendant F by a pivot-joint at J. 4 is a loose strip of metal attached to the upper portions of this hinge-joint by a staple at 1. Upon the lower part of this hinge-joint, and secured to the same by another staple, is the bait-hook, as shown at 5.

Operation.

Figure 1:
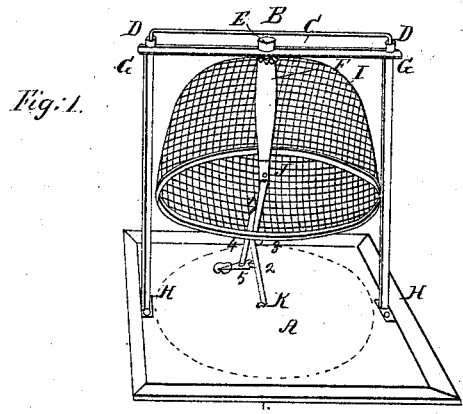
Figure 1 is a perspective view of the trap, with the cage raised and set with catch baited.
Figure 2:
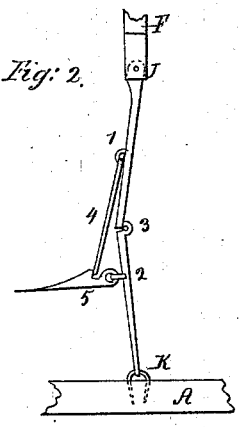
Figure 2 is an enlarged view of the lock and catch as set.

Grasping the horizontal part of the gallows standard with the palm of the hand, the cross-bar, with its attached cage, is raised with the fingers until the said bar is near the top of the standard; by so doing the hinged strip connecting the pendant F with the base A is raised to nearly a vertical position. The loose strip 4 is then brought down upon 1–3, and secured in this position by catching its lower end on the lip of the bait-hook 5. Upon removal of the hand from B and C, the whole will be found retained in position as shown in fig. 1. The trap is now furnished with some proper bait upon the end of 5, and placed in the locality frequented by the animals, who, in their search for food, nibble at the bait thus left for them. A slight motion of this catch releases the strip 4, whose freedom releases the hinge at 3, and thus the rest of the parts, viz, pendant, cage, and cross-bar, being relieved of their support, are at once brought to the position shown at fig. 3, by the recoil of the springs G G, and thus affording a very effectual means of entrapping the little rascals.

Having thus described the construction and operation of my invention, what I claim, and desire to secure by Letters Patent, is—

The use of the suspended cage I, attached to the cross-bar C, together with the pendant F and the lock 1 2 3 4 5 K, as herein described.

SAMUEL S. RAIN.

Witnesses:
JOHN JAY KNOX,
F. LEONARD.